2,775,589

SUBSTITUTED AZACYCLOALKANES AND
PROCESS OF PRODUCING THEM

Julius Diamond, Philadelphia, and William F. Bruce, Havertown, Pa., assignors to American Home Products Corporation, New York, N. Y., a corporation of Delaware No Drawing. Application June 28, 1955,
Serial No. 518,651

7 Claims. (Cl. 260—239)

This invention relates to cyclic compounds and more particularly involves azacycloalkanes and the method for preparing them.

This application is a continuation-in-part of application Serial No. 403,448, filed January 11, 1954, which, in turn, is a continuation-in-part of application Serial No. 297,185, filed July 3, 1952.

In accordance with one method for making the compounds of the invention as disclosed in our application Serial No. 403,448, the preparation of the compounds involves as a first step the alkylation of a 2-aryl-4-dialkylamino butyronitrile with a polymethylene sulfonic acid ester or halide having 3 to 8 methylene groups, this reaction being carried out in the presence of a reagent capable of displacing an active hydrogen. Following the alkylation reaction, the product obtained is cyclized, utilizing a highly polar solvent. The cyclic compound produced is then partially split or decomposed and, as a final procedure, the compound so treated is hydrolyzed and then esterified to prepare the carbalkoxy compound, or the cyanoazacycloalkane is either reacted with an alkyl Grignard or alkyl-lithium and then hydrolyzed to form an acyl azacycloalkane or is decyanated and the resulting azacycloalkane acyloxylated.

The starting compound, in accordance with the first method, is alkylated with the selected polymethylene compound in the presence of a reagent capable of displacing an active hydrogen, preferably an alkali metal amide such as sodium, potassium or lithium amide although phenyl-sodium, phenyl-lithium or butyl-lithium are also operable. The reaction is carried out in the presence of a solvent which may be either ethyl ether or an aromatic hydrocarbon such as benzene, toluene or xylene. Substantially anhydrous conditions should be utilized for best results and, while not necessary, an inert atmosphere, such as nitrogen gas, is desirable for the reaction. The reaction goes easily at ordinary temperatures, and, although room temperature or a temperature from about 10° to 35° C. is preferred, one may operate in the broader range from about −10° C. to about 50° C.

The aryl-tertiary-amino-halocaproic or higher fatty acid nitrile produced in the first step is heated in the presence of a highly polar organic compound having a relatively high dielectric constant or dipole moment. A cyclization of the amino-haloalkane takes place resulting in the formation of a cyclic quaternary ammonium compound. The temperature of reaction may range from about 70° to about 120° C., a preferred temperature being in the neighborhood of 100° C.

The preferred procedure for carrying out this type of cyclization reaction comprises solubilizing the amino-nitrile in the polar solvent to form a solution ranging from about 0.1–5.0 moles per liter and heating the mixture until no more salt precipitates out. If desired, one may use in addition to the polar solvent any solvent which will make the reaction product less soluble therein. Thus, hydrocarbon solvents such as heptane, benzene, toluene, xylene, etc., have been found suitable in admixture with the polar solvent. While the preferred dilution in the solvent is approximately 1.0 mole per liter or the range as stated above, one may obtain satisfactory results with a dilution as high as .01 molar or in this neighborhood. While it has been indicated that the proper concentration of alkylation product in the solvent or solvents may merely be made up and heated, one may also carry out the reaction by heating the solvent and admitting the alkylation product thereto in small amounts. It has been found that in high concentrations, such as about 5.0 moles or greater, the reaction yields are excellent but the quality of product is poor, whereas in the low concentrations, such as .001 molar or lower, while the quality of product is good, the yields are so low as to make the process uneconomic.

The polar solvent selected has been found to be an important factor in the above-described cyclization process. Highly polar solvents were discovered to give very satisfactory results, such solvents having a dipole moment under standard conditions (20° C.) of about 2.5 debye units to about 4.5 debye units or somewhat less. The dielectric constant should have a value (epsilon) above 10 and preferably from about 15 to 40 when measured under standard conditions. The solvent selected should also have a boiling point above about 70° C.

To prepare the novel azacycloalkanes from the quaternary salt, the latter is decomposed to remove alkyl halide. This decomposition reaction is carried out by heating the quaternary in the range of about 200 to about 250° C. If desired, an inert organic solvent may be used, such solvent being selected with a boiling range within the reactive temperature range noted and under refluxing conditions. Tetralin, nitrobenzene, and especially the higher alcohols have been found effective. In the case of tetralin, the quaternary is insoluble therein but, as the reaction proceeds, the azacycloalkane goes into solution. On the other hand, the alcohols mentioned are at least partial solvents for the quaternary salt as well as the reaction product.

When the azacycloalkane reaction product stays in solution in the solvent, it may be removed by a solvent extraction procedure. For this step, the reaction mixture is extracted with a concentrated mineral acid in aqueous solution which is separated and washed. The washed extract is now made alkaline and is then solvent extracted, using ether or other solvent in which the free base is soluble. The latter may then be isolated by distilling off the solvent.

On obtaining the cyano-azacycloalkane, it is decyanated in one procedure by heating the cyclic cyano compound with an alkali-metal amide such as sodium, potassium or lithium amide in the presence of an inert organic solvent of the aliphatic type such as hexane or higher, or of the benzenoid type such as benzene, toluene or xylene. The reaction will take place in the range of about 50° to about 150° C. A preferable temperature range of operation is in the neighborhood of 90° to 110° C.

Another procedure for preparing the decyanated azacycloalkanes involves hydrolyzing the corresponding cyano compound to form the 4-amido-azacycloalkane, and then reacting the latter compound with an alkali metal hydroxide which forms first the carboxylic acid salt of the alkali metal followed by a decarboxylation to the desired compound. This stepwise procedure is carried out first about 190° C. for the formation of the amide, with the temperature being raised in the neighborhood of about 250° C. for the final steps. If only the decyanated product is sought, with no desire to separate out the carbamido or the carboxylic acid intermediate compounds, the reaction may be carried out by merely heating the cyano compound with the hydroxide and water between about 200° to 300° C.

The decyanated azacycloalkane may be acyloxylated by heating the selected azacycloheptane with a tetra-valent lead salt of a lower aliphatic acid in the presence of the corresponding acid. The reaction temperature is maintained in the neighborhood of about 100° C.

An acyloxy product may also be obtained by reacting the 4-amido-azacycloalkane prepared as described earlier with alkali-metal hypobromite (prepared by reacting an aqueous alkali-metal hydroxide with bromine) forming the corresponding 4-amino-azacycloalkane. The latter is dissolved in an aqueous solution of acetic acid and sodium nitrite is added. After reaction, the product is vasified to obtain the alcohol. The 4-hydroxy azacycloalkane may then be reacted with acetic or propionic anhydride to form the acyloxy product.

A still further procedure for making desired compounds involves a series of known reactions, starting with the preparation of N - (2 - cyanoethyl) - N - (omega-cyanoalkane)methylamine. This product is then cyclized using lithium N-ethylanilide to form lithio derivatives of 4-imino azacycloalkanes and the latter are then treated with strong sulfuric acid to change the imine group to a carbonyl oxygen. The compound thus formed is reacted with phenyl lithium to form the same alcohol as prepared by the 4-amido route, namely, 4-phenyl-4-hydroxy-N-lower alkyl-azacycloalkane. As before, this compound is reacted with a fatty acid anhydride to form the corresponding 4-acyloxy compound.

A preferred procedure for preparing acyloxy azacycloalkanes because of improved yields of desired product will now be described, starting with an illustration of the reaction steps:

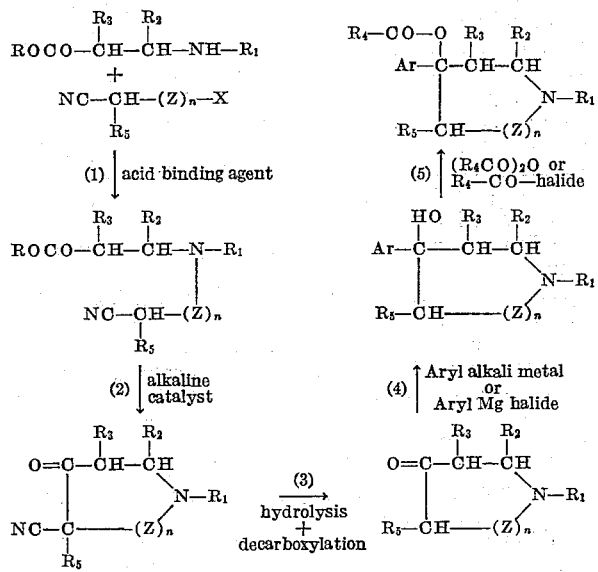

In the above formulae, R is intended to represent a lower alkyl, $R_1$ standing for a lower alkyl, alkenyl or aralkyl radical with $R_2$, $R_3$ and $R_5$ each representing hydrogen or lower alkyl and $R_4$ standing for a lower alkyl, alkenyl, aryl or aralkyl radical.

The designation X is intended to represent a halogen such as chlorine, bromine or iodine or —$OSO_2O$-lower alkyl while Z is a methylene radical and $n$ represents the integer 2 or 3. It is contemplated that $(Z)_n$ could represent a straight or branched-chain lower alkylene group, i. e. —$CH_2CH_2$— or —$CH_2CHR$—.

The designation Ar, standing for an aryl radical is intended to present either phenyl or the phenyl radical having 1 to 3 substituents such as lower alkyl, lower alkoxy, halogen, nitro, hydroxy, lower aliphatic aryl, lower acyloxy, amino and mono- and di-lower alkylamino radicals.

Reaction (1) is carried out with such acid binding agents as $K_2CO_3$, $Na_2CO_3$ or $CaCO_3$ in a high boiling ether or alcohol as for example di-n-butyl ether, diisopropyl ether or n-butanol at a temperature in the range of about 80° to about 150° C. This reaction produces an omega, omega'-ester-nitrile which is to be utilized in a self-condensing reaction, forming an azacycloalkane.

Reaction (2) is a novel cyclization step, whereby the omega, omega'-ester-nitrile is cyclized in the presence of an alkaline catalyst dissolved in a hydrocarbon catalyst as for example toluene, xylene, tetralin or decalin. Preferred catalysts are the alkali-metal alcoholates as for example $NaOCH_3$, $NaOC_2H_5$ or alkali metal hydrides such as NaH. The cyclizing reaction is carried out at a temperature in the range of about 100° to about 150° C. The use of an ester-nitrile instead of a di-ester or di-nitrile results in substantially improved yields of cyclized products.

The decyanation of the azacycloalkanone according to reaction (3) is preferably accomplished via an acid hydrolysis utilizing for example HCl, HBr, HI, $H_2SO_4$ or $H_3PO_4$ in water and operating at a temperature in the range of about 70° to about 140° C.

If desired, this decyanation step may also be carried out via an alkaline hydrolysis as disclosed previously in the first process, operating under the conditions as hereinabove described.

The arylation and alcohol-forming step is accomplished in reaction (4) by treating the decyanated azacycloalkanone with the desired aryl as an aryl alkali-metal, e. g., aryl-Li or aryl-Na or, in lieu thereof, utilizing an aryl magnesium halide as, for example, $C_6H_5MgBr$. The arylating agent is dissolved in an ether-hydrocarbon mixture as, for example, diethyl-ether with benzene. The reaction is carried out at an initial temperature range of about —35° to about +10° C. followed by a brief heating period at about +35° to +80° C.

Reaction (5), to produce the acyloxy azacycloalkane, utilizes an acid anhydride as, for example $(C_2H_5CO)_2O$, or an acid halide, e. g., $C_2H_5COCl$, together with an acid binding agent such as pyridine in ether or hydrocarbon solvent such as benzene or a mixture of solvents. The reaction is started in the temperature range of about —20° C. to +20° C. and it is followed by a brief heating period in the range of about +35° to +80° C.

The specific examples illustrate in greater detail methods for obtaining typical compounds of the invention.

EXAMPLE 1

*1-dimethylamino-3-cyano-3-phenyl-6-bromohexane*

0.35 mole (65.8 gms.) of 2-phenyl-4-dimethylaminobutyronitrile in 350 cc. of absolute ether was dripped into a stirred suspension of 0.45 mole (17.5 gms.) of sodamide in 350 cc. of absolute ether during one hour, keeping the reaction mixture under a dry nitrogen atmosphere. The mixture was stirred an additional hour at room temperature and then one hour at reflux temperature. The mixture was diluted with 250 cc. of absolute ether, cooled in an ice bath, then, while stirring, a solution of a 0.37 mole (74.7 gms.) of trimethylene bromide in 250 cc. of absolute ether added at once. The yellow suspension continued to be stirred at ice-bath temperature for one hour, then at room temperature for one hour, and finally at reflux temperature for three hours. The mixture was cooled, and the sodium bromide, which had precipitated in quantitative yield, was filtered off and washed with ether. The light yellow ethereal filtrate contained the product. This compound could be stored for some time in a hydrocarbon solvent, e. g., n-heptane, at +5° C.

In place of the butyronitrile used in the above procedure, one may start with other α-arylated tertiary-γ-aminobutyronitriles such as 2-(m-anisyl)-4-dimethylaminobutyronitrile, 2-(o-anisyl)-4-dimethylaminobutyronitrile, 2-(m-nitrophenyl)-4-dimethylaminobutyronitrile. 2- benzhydryl-4-dimethylamino-3-methylbutyronitrile, 2-($\beta$-naphthyl)-4-dimethylamino-4-methylbutyronitrile, 2-(p-tolyl)-4-diethylaminobutyronitrile, 2-phenyl-4-methylethylaminobutyronitrile, 2 - (p - chlorophenyl)-4-di-n-butylaminobutyronitrile.

As a substitute for the halide in the above procedure, one may use trimethylene-1,3-chlorobromide, trimethylene-1,3-dichloride, trimethylene - 1,3 - bromoiodide, trimethylene 1,3-diiodide, 1,3-di-p-tosyloxy propane, 1-chloro-1,3-p-toxyloxy propane and 1-bromo-3-methane sulfoxy propane. The reaction takes place without difficulty, one merely keeping the molar proportions the same in all cases.

*4-phenyl-4-cyano-N-methyl azacycloheptane methobromide*

A 0.1 M nitrobenzene solution of 1-dimethylamino-3-cyano-3-phenyl-6-bromohexane was kept at 100° C. for one hour whereby the quaternary salt precipitated out; M. P. 246–247° C. Mol. wt. theory=309; mol. wt. found=305.

*Analysis.*—Calc. for $C_{15}H_{21}N_2Br$: Br=25.83; C=58.30; H=6.84; N=9.06. Found: Br=25.25; C=58.36; H=7.04; N=8.86.

In place of nitrobenzene, other highly polar solvents may be used as, for example, ortho-nitrotoluene, benzonitrile, 2-nitropropane or ketones, such as methylisobutyl ketone, diisopropyl ketone, acetophenone, etc.

*Alternative preparation via the methochloride 1-dimethylamino-3-cyano-3-phenyl-6-chlorohexane*

1.05 moles (197.4 gms.) of 2-phenyl-4-dimethylamino butyronitrile in 0.5 l. absolute ether was added to a stirred suspension of 1.25 moles (5.25 gms.) of sodamide in 0.5 l. absolute ether at such a rate as to allow gentle refluxing of the ether. The system was kept under a dry nitrogen atmosphere. After the addition the refluxing was continued an additional two hours. The mixture was cooled at +2° C., then, to the stirred mixture was added 1.11 moles (174.3 gms.) of trimethylene chlorobromide in 0.2 l. absolute ether at such a rate as to keep the temperature below +10° C. At the end of the addition the mixture continued to be stirred one-half hour in an ice-bath. Then 2 hours at room temperature and finally allowed to stand overnight. The precipitated inorganic salts were filtered off. The ethereal filtrate contained the product.

*4-phenyl-4-cyano-N-methyl azacycloheptane methochloride*

The ether in the filtrate obtained above was distilled off under reduced pressure well below room temperature and an amount of o-nitrotoluene was added to the liquid residue to make up a 1.0 M solution. The solution was kept at 100° C. for 15 hours. The precipitated quaternary salt was filtered off, washed with acetone, and dried. The yield was 80% of theory. The pure methochloride melts at 265–6° C. with decomposition. Methyl chloride was split out by the same method used to split out methyl bromide from the quaternary methobromide compound. Using "undecanol" an 86% yield of the tertiary amine was obtained in either case.

*4-phenyl-4-cyano-N-methyl azacycloheptane*

0.02 mole (6.2 gms.) of the methobromide quaternary salt was suspended in 150 cc. of tetralin. While vigorously stirring, the mixture was heated to its reflux temperature, whereupon the solid began to disintegrate and go into solution. The stirring and refluxing was continued for one hour, then the mixture cooled, water added, and the layers separated. The tetralin solution was extracted with 3M-aqueous hydrochloric acid, the acid extract washed with ether, then made alkaline with aqueous sodium hydroxide and extracted with ether. The ether extracts were dried, filtered, and the solvent distilled off. Vacuum distillation of the liquid residue gave the tertiary amine, B. P. 119–121° C./0.25 mm., $n_D^{22°}$=1.5341, $d^{22°}$=1.030, $M_D$ (calc.)=64.76, $M_D$ (obs.)=64.66.

*Analysis.*—Calc. for $C_{14}H_{18}N_2$: C=78.42, H=8.46, N=13.07. Found: C=78.35; H=8.98; N=12.74.

Picrate, M. P. 173–175° C./acetone-methanol.

*Analysis.*—Calc. for $C_{20}H_{21}O_7N_5$: C=54.20, H=4.77, N=15.80. Found: C=54.18, H=5.19, N=15.41.

The above process may also be carried out with alcohols boiling between about 200° and 250° C. in place of tetralin. Alcohols such as n-decyl alcohol, trimethyl nonyl alcohol and 5-ethyl-2-nonyl alcohol are examples. The following procedure utilizes one of such alcohols.

6.2 gms. (0.02 mole) of 4-phenyl-4-cyano-N-methyl azacycloheptane methobromide was suspended in 100 cc. of 5-ethyl nonanol-2. While stirring vigorously the mixture was brought to reflux (225° C.) when the solid began to dissolve and the evolution of methyl bromide gas began. The refluxing and stirring was continued 3 hours, then the mixture was cooled, extracted with 3-N-aqueous hydrochloric acid, the acid extract washed with ether, then basified with 25% aqueous sodium hydroxide, and extracted with ether. The ether extract was dried over anhydrous potassium carbonate, filtered and distilled. The tertiary amine came over at 132–136° C./0.35 mm.; picrate, M. P. 174–175° C.

*1-methyl-4-phenyl-azacycloheptane and salts thereof*

A mixture of 0.05 mole (10.7 g.) 4-cyano-1-methyl-4-phenylazacycloheptane and 0.11 mole (4.3 g.) sodamide in 100 ml. of toluene is refluxed while stirring for 6 hours. The cooled mixture is washed with water, then the toluene layer extracted with acid, the acid extract washed with ether, treated with sodium hydroxide and the reaction product extracted with ether. The ether extract is dried, filtered, and distilled. The product, 1-methyl-4-phenyl-azacycloheptane is collected at 88–90° C. (0.25 mm.); $n_D^{29}$ 1.5288.

*Analysis.*—Calcd. for $C_{13}H_{19}N$: C, 82.47; H, 10.12; N, 7.40. Found: C, 82.20; H, 10.41; N, 7.51.

The picrate, M. P. 149–150° C., is prepared in methanol.

*Analysis.*—Calcd. for $C_{19}H_{22}N_4O_7$: C, 54.55; H, 5.30; N, 13.38. Found: C, 54.52; H, 5.03; N, 13.20.

To form the hydrochloric acid-addition salt, 0.1 mole (3.6 g.) of hydrogen chloride gas is passed into 50 ml. of a cold 1:1 ether-acetone solution containing 0.1 mole (18.9 g.) of the base. The precipitated hydrochloride is filtered off and washed with ether. It could be further purified by recrystallization from methyl ethyl ketone to give a fine white solid, M. P. 78–79° C.

To form a quaternary ammonium compound, 0.1 mole (14.2 g.) of methyl iodide is added slowly to a cold acetone solution containing 0.1 mole (18.9 g.) of the base. The mixture is kept at 25° C. for 3 hours, then the precipitated white solid filtered off and washed with acetone; the product, 1-methyl-4-phenyl-azacycloheptane methiodide, had a melting point of 146–147° C.

Another quaternary ammonium compound is formed when 0.1 mole (17.0 g.) of isopropyl iodide is added to an ether solution containing 0.1 mole (18.9 g.) of the base and the mixture allowed to stand at room temperature for 2 days. The precipitated yellowish solid is filtered and washed with ether; the product, 1-methyl-4-phenyl-azacycloheptane isopropiodide, had a melting point of 166–169° C.

It is obvious that other salts as well as quaternary ammonium compounds may be prepared by following the above procedures. Thus, besides the salts mentioned, one may prepare the corresponding salts by reacting the free base with hydrogen bromide, sulfuric acid, nitric acid, phosphoric acid or other inorganic acids as well as the lower aliphatic acids such as acetic acid, propionic acid, lactic acid, etc. With regard to other quaternary salts, various alkyl halides may be used of the lower and higher type such as lauryl bromide or chloride where a long-chain alkyl group is desired on the base moiety.

*1-2-dimethyl-4-phenyl-azacycloheptane and a salt thereof*

In the same manner as taught in the preceding synthesis and starting with 0.05 mole (11.4 g.) of 4-cyano-1,2-dimethyl-4-phenylazacycloheptane, one may obtain the free base 1,2-dimethyl-4-phenyl-azacycloheptane, B. P. 106°–108° C. (0.2 mm.), $n_D^{27}$ 1.5255.

Analysis.—Calcd. for $C_{14}H_{21}N$: C, 82.65; H, 10.40; N, 6.88. Found: C, 82.25; H, 10.35; N, 6.66.

The picrate, M. P. 128–130° C., was prepared in methanolether.

Analysis.—Calcd. for $C_{20}H_{24}N_4O_7$: C, 55.60; H, 5.59; N, 12.95. Found: C, 55.35; H, 5.58; N, 12.70.

*1,3-dimethyl-4-phenyl-azacycloheptane and a salt thereof*

Proceeding similarly to the last synthesis and starting with 0.05 mole (11.4 g.) 4-cyano-1,3-dimethyl-4-phenylazacycloheptane, the product obtained is 1,3-dimethyl-4-phenylazacycloheptane, B. P. 98°–100° C. (0.25 mm.), $n_D^{31}$ 1.5251.

Analysis.—Calcd. for $C_{14}H_{21}N$: C, 82.65; H, 10.40; N, 6.88. Found: C, 82.06; H, 10.35; N, 6.60.

The methiodide, M. P. 184–190° C., was prepared in acetone.

Analysis.—Calcd. for $C_{15}H_{24}NI$: C, 52.20; H. 7.00; N, 4.06; I, 36.75. Found: C, 51.86; H, 7.14; N, 3.72; I, 36.4.

EXAMPLE 2

*4-acetoxy-4-phenyl-1-methylazacycloheptane and salts thereof*

0.30 mole of 4-phenyl-1-methylazacycloheptane is dissolved in 300 ml. of acetic acid. The temperature of the solution is raised to 80° C. While stirring mechanically 0.33 mole of lead tetraacetate is added portionwise so as to maintain the temperature at 80–85° C. Carbon dioxide and an aliphatic hydrocarbon gas are evolved. The temperature is maintained an additional half-hour, then the acetic acid is pumped off under reduced pressure. The cooled residue is treated with enough ice-cold sodium sulfate solution to precipitate all the lead as $PbSO_4$. The filtrate is made alkaline with ice-cold sodium carbonate solution then extracted repeatedly with chloroform. The combined chloroform extracts are dried over anhydrous potassium carbonate, filtered, and the solvent distilled off. By distilling the residue under reduced pressure there is obtained as forerun some unreacted starting material, B. P. 95–100° C. (0.3 mm.) This is followed by a higher boiling fraction, B. P. 147–152° C. (0.3 mm.), $n_D^{25°}$ 1.5279, containing the product.

The picrate, M. P. 183–183.5° C. dec., is prepared in methanol-ether and recrystallized from acetone-methanol.

Analysis.—Calcd. for $C_{21}H_{24}N_4O_9$: C, 52.95; H, 5.08. Found: C, 53.18; H, 5.36.

The methiodide, M. P. 218–219° C. dec., is prepared in a mixture of acetone and ether.

Analysis.—Calcd. for $C_{16}H_{24}INO_2$: C, 49.37; H, 6.21; N, 3.60; I, 32.6. Found: C, 49.38; H, 6.54; N, 3.38; I, 32.6.

EXAMPLE 3

*4-acetoxy-4-phenyl-1,2-dimethylazacycloheptane*

Starting with 1,2-dimethyl-4-phenylazacycloheptane, the acetoxy group is introduced in an analogous manner to that described above. Fractional distillation of the residue gives as forerun some unreacted starting material, B. P. 95–100° C. (0.3 mm.). This is followed by a high boiling fraction, B. P. 138–148° C. (0.3 mm.), $n_D^{25°}$ 1.5296, containing the product.

The methiodide, M. P. 60–65° C. dec., is prepared in ether and noted to be very hygroscopic.

EXAMPLE 4

*4-propionoxy-4-phenyl-1,3-dimethylazacycloheptane*

0.30 mole of 4-phenyl-1,3-dimethylazacycloheptane is dissolved in 300 ml. propionic acid. At 80–85° C., 0.33 mole lead tetrapropionate is added portionwise while stirring. One-half hour after addition is completed, the propionic acid is pumped off under vacuum. The cooled residue is treated with enough ice-cold aqueous $Na_2SO_4$ solution to precipitate all the lead as $PbSO_4$. The filtrate is made alkaline with ice-cold aqueous $Na_2CO_3$, then extracted with $CHCl_3$. The chloroform extract is dried, filtered and concentrated. Vacuum distillation of the residue gives, after a forerun of unreacted starting amine, the product as a high boiling liquid.

EXAMPLE 5

*4-acetoxy-4-phenyl-1,3-dimethylazacyloheptane*

Starting with 1,3-dimethyl-4-phenylazacycloheptane, the acetoxy group is introduced in an analogous manner to that described above. Fractional distillation of the residue gives as forerun some unreacted starting material, B. P. 95–100° C. (0.3 mm.). This is followed by a high boiling fraction, B. P. 142–152° C. (0.3 mm.), $n_D^{27.5}$ 1.5242, containing the product.

The methiodide, M. P. 95–97° C., was prepared in ether.

Analysis.—Calcd. for $C_{17}H_{26}INO_2$: C, 50.61; H, 6.50; N, 3.47. Found: C, 50.82; H, 6.85; N, 3.50.

In like manner, using lead tetra-isobutyrate with isobutyric acid, or higher lead salts with corresponding acids, other acyloxy compounds may be prepared.

EXAMPLE 6

*Synthesis of 4-phenyl-4-acetoxy-1-methylazacycloheptane from N-(2-cyanoethyl)-N-(3-cyanopropyl) methylamine (Compound I)*

(a) PREPARATION OF COMPOUND I

A solution of 0.60 mole (61.8 g.) of 4-chlorobutyronitrile in 50 ml. of n-butanol was added dropwise, during 4 hours, to a stirred mixture of 0.66 mole (55.4 g.) of 3-methylaminopropionitrile, 0.90 mole (95.4 g.) of anhydrous sodium carbonate, and 0.03 mole (5 g.) of potassium iodide, heated to its reflux temperature.

The mixture was refluxed while stirring for an additional 13 hours. It was then cooled, and the inorganic salts filtered off and washed with ether. The filtrate and washings were combined and extracted with aqueous hydrochloric acid. The acid extract was washed with ether, basified by the addition of potassium carbonate, and extracted with ether. After drying the ether extract, over anhydrous potassium carbonate, it was filtered, and the filtrate distilled.

Compound I was obtained as a colorless liquid, B. P. 135–140° (0.4 mm.), $n_D^{26}$ 1.4543, $d_4^{26}$ 0.965.

Analysis.—Calcd. for $C_8H_{13}N_3$: C, 63.53; H, 8.68; N, 27.79. Found: C, 63.14; H, 8.46; N, 27.90.

The picrate, M. P. 144–5°, was formed in methanol and recrystallized from acetone-methanol.

Analysis.—Calcd. for $C_{14}H_{16}N_6O_7$: C, 44.2; H, 4.24; N, 22.1. Found: C, 44.5; H, 4.66; N, 22.0.

(b) 1-METHYLAZACYCLOHEPTANONE-4 (COMPOUND III)

A 0.6 M ethereal solution of lithium N-ethylanilide was prepared by reacting, under a nitrogen atmosphere, 0.6 g.-atom (4.2 g.) of lithium "shot," 0.75 mole (90.8 g.) of N-ethylaniline, and 0.35 mole (44.8 g.) of naphthalene in 1 liter of anhydrous ether. The mixture was heated at its reflux temperature until all the lithium had dissolved and a clear yellow solution was obtained.

To the first solution was added, during 7 hours, a solution of 0.20 mole (30.2 g.) of Compound I in 500 ml. of anhydrous ether. The second solution was added through the condenser, while the first solution was being vigorously stirred as it refluxed. A white precipitate was formed which consisted of a mixture of the lithio derivatives of 3 and 5-cyano-4-imino-N-methyl-azacycloheptanes (Compounds IIa and IIb). The cooled mixture was filtered, and the precipitate washed with anhydrous ether.

The precipitate was added in small portions, at +5°, to a solution of 136 ml. of 98% sulfuric acid and 105 ml. of water. The resulting solution was heated at 120–130° until no further evolution of carbon dioxide gas was detected (5 hours). After cooling the mixture, it was basified by the portionwise addition of solid sodium carbonate, and extracted with chloroform. The chloroform extract was dried over anhydrous potassium carbonate, filtered, and distilled.

Compound III was obtained as a colorless liquid, B. P. 115–120° (45 mm.), $n_D^{23}$ 1.4893, $d_4^{23}$ 0.963. The base darkened rapidly on standing.

The picrate, M. P. 171–2° dec., was formed in methanol and recrystallized from acetone-methanol.

*Analysis.*—Calcd. for $C_{13}H_{16}N_4O_8$: C, 43.8; H, 4.53; N, 15.72. Found: C, 44.0; H, 4.55; N, 15.68.

(c) 4-PHENYL-4-ACETOXY-1-METHYLAZACYCLO-HEPTANE (COMPOUND V)

A solution of phenyl lithium was prepared, under a nitrogen atmosphere, from 0.15 g.-atom (1 g.) of lithium "shot" and 0.08 mole (12.6 g.) of bromobenzene in 50 ml. of anhydrous ether. The solution was cooled to +5° and 0.0472 mole (6 g.) of Compound III in 50 ml. of benzene was added dropwise while stirring. After the addition was completed the mixture was heated at its reflux temperature for 2 hours. At this point 4-phenyl-4-hydroxy-1-methylazacycloheptane (Compound IV) was present as its lithio derivative.

The mixture was cooled again to +5°, and 0.08 mole (8 ml.) of acetic anhydride in 25 ml. of benzene was added dropwise while stirring. It was then heated at its reflux temperature for 2 hours. The cooled mixture was extracted with dilute hydrochloric acid, the acid extract washed with ether, basified with aqueous sodium hydroxide solution, and extracted with ether. The ether extract was dried over anhydrous potassium carbonate, filtered, and distilled.

Compound V was obtained as a pale yellow liquid, B. P. 120–125° (0.3 mm.), $n_D^{29}$ 1.5375.

The methiodide, M. P. 215–217° dec., was formed in acetone. A mixture of the latter derivative with the methiodide (M. P. 218–219° dec.) of the base prepared by Example 2 melted at 217–218° dec., thereby proving their identity.

EXAMPLE 7

*Synthesis of 4-phenyl-4-acetoxy-1-methyl-azacycloheptane from 4-phenyl-4-amino-1-methylazacycloheptane (Compound VII)*

(a) PREPARATION OF COMPOUND VII

A solution of sodium hypobromite was prepared by adding 0.25 mole (40 g.) of bromine to 0.75 mole (30 g.) of sodium hydroxide in 250 ml. of water at +5°.

To this solution 0.2 mole (50 g.) of 4-phenyl-4-carbamyl-1-methylazacycloheptane monohydrate (Compound VI) was added in one batch at +5° while stirring. The temperature of the mixture was allowed to rise spontaneously to 46° whereupon most of the solid dissolved. After heating the mixture at 85–90° for ½ hour, it was cooled, saturated with sodium carbonate, and extracted with chloroform. The chloroform solution was extracted with aqueous hydrochloric acid, the acid extract basified with sodium hydroxide solution, and extracted with chloroform. After drying the extract over anhydrous potassium carbonate, it was filtered, and distilled.

Compound VII was obtained as a pale yellow liquid, B. P. 112–114° (0.3 mm.), $n_D^{27}$ 1.5495, $d_4^{27}$ 1.02.

*Analysis.*—Calcd. for $C_{13}H_{20}N_2$: C, 76.40; H, 9.83; N, 13.71. Found: C, 76.00; H, 9.33; N, 13.28.

The monopicrate, M. P. 168–169°, was formed in ether.

*Analysis.*—Calcd. for $C_{19}H_{23}N_5O_7$: C, 52.63; H, 5.34; N, 16.25. Found: C, 52.84; H, 5.31; N, 16.56.

(b) 4-PHENYL-4-HYDROXY-1-METHYLAZACYCLO-HEPTANE (COMPOUND IV)

Compound VII (0.075 mole, 15.3 g.) was dissolved in an aqueous solution of acetic acid, prepared from 9 g. of glacial acetic acid and 75 ml. of water. A solution of 0.08 mole (5.5 g.) of sodium nitrite in 25 ml. of water was added at once. No rise in temperature occurred, but a slow evolution of nitrogen gas was observed. The mixture was allowed to stand at room temperature for ½ hour, then heated at 85° for 2 hours. At this time, the evolution of gas was negligible. The cooled mixture was diluted with an equal volume of water and washed with ether. It was then basified with sodium hydroxide solution, extracted with ether, the ether extract dried over anhydrous potassium carbonate, filtered, and distilled.

After collecting 3.7 g. of an unidentified forerun, B. P. 102–106° (0.3 mm.), $n_D^{26}$ 1.5532, 7 g. of a second fraction, B. P. 120–122° (0.3 mm.) $n_D^{26}$ 1.5515, was obtained. Analysis of the latter material indicated that it was mainly Compound IV.

*Analysis.*—Calcd. for $C_{13}H_{19}NO$: C, 75.98; H, 9.32; N, 6.82. Found: C, 75.59; H, 9.26; N, 7.29.

(c) 4-PHENYL-4-ACETOXY-1-METHYLAZACYCLO-HEPTANE (COMPOUND V)

A solution containing 0.005 mole (1 g.) of crude Compound IV (aforementioned second fraction), 0.05 mole (5 g.) of acetic anhydride, and 1 drop of 37 N sulfuric acid in 60 ml. of benzene was heated at its reflux temperature for 3 hours. The mixture was cooled, extracted with aqueous hydrochloric acid, and the acid extract washed with ether, basified with sodium hydroxide solution, and extracted with ether. After drying the ether extract over anhydrous potassium carbonate, it was filtered, and concentrated. The liquid residue (crude Compound V) was taken up in acetone and methyl iodide added.

The methiodide, M. P. 220–221° dec., of Compound V crystallized out. A mixture of this derivative with the methiodide of the base obtained by Example 2 melted at 220–221° dec., thereby establishing their identity.

EXAMPLE 8

*Synthesis of 4-phenyl-4-propionoxy-1,3-dimethylazacycloheptane N-(2-carbomethoxypropyl)-N-(3-cyanopropyl) methylamine (Compound I)*

A mixture of 1.4 moles (187 g.) of methyl 3-methylamino-2-methylpropionate, 1.4 moles (144 g.) of 4-chlorobutyronitrile, and 1.6 moles (221 g.) of anhydrous potassium carbonate in 350 ml. of di-n-butyl ether was heated at 110–115°, while stirring, for 15 hours. After cooling the mixture, the inorganic salts were filtered off, and the filtrate extracted with aqueous hydrochloric acid. The acid extract was washed with ether, basified with sodium hydroxide solution, and extracted with ether. The ether extract was dried over anhydrous potassium carbonate, filtered, and distilled.

The desired Compound I was obtained as a colorless liquid, B. P. 100–105° (0.25 mm.), $n_D^{25}$ 1.4445.

*Analysis.*—Calcd. for $C_{10}H_{18}N_2O_2$: C, 60.60; H, 9.15; N, 14.15. Found: C, 60.55; H, 9.09; N, 14.09.

*1,3-dimethylazacycloheptanone-4 (Compound III)*

A mixture of 0.40 mole (79.3 g.) of Compound I and 0.42 mole (22.7 g.) of sodium methoxide in 1.5 liters of dry xylene was stirred under a nitrogen atmosphere while gradually raising the temperature. A mixture of methanol and xylene was slowly distilled off. Within 4 hours, 250 ml. of distillate was collected. This was replaced by an equal volume of dry xylene, and the slow distillation continued. The operation was repeated until the boiling point of pure xylene was attained. The total time required to collect 750 ml. of distilled xylene was 12 hours. At this point, the sodio derivative of the 5-cyano-1,3-dimethyl-azacycloheptanone-4 (Compound II) was suspended in the xylene as an orange-colored precipitate.

The cold mixture was extracted with 750 ml. of 1.75 N hydrochloric acid. The acid extract gave a strong positive enol test with ferric chloride solution. An additional 250 ml. of 12 N hydrochloric acid was added, and the solution heated at its reflux temperature for 24 hours. The evolution of carbon dioxide gas was vigorous at the beginning of the heating period, gradually subsided, and was negligible after 24 hours. At this point, the enol test with ferric chloride was negative. The cold solution was basified with 40% sodium hydroxide solution, and extracted with ether. The ether extract was dried over anhydrous potassium carbonate, filtered, and distilled.

The 1,3-dimethylazacycloheptanone-4 (Compound III) was obtained as a pale yellow liquid, B. P. 110° (35 mm.), $n_D^{29}$ 1.4656.

Analysis.—Calcd. for $C_8H_{15}NO$: C, 68.10; H, 10.70; N, 9.93. Found: C, 68.07; H, 10.45; N, 10.23.

The picrate, M. P. 192–193° dec., was formed in hot methanol.

Analysis.—Calcd. for $C_{14}H_{18}N_4O_8$: C, 45.40; H, 4.90; N, 15.14. Found: C, 45.64; H, 4.92; N, 15.14.

The hydrochloride, M. P. 158–160°, was formed in ether.

Analysis.—Calcd. for $C_8H_{16}ClNO$: N, 7.84; Cl, 19.95. Found: N, 7.81; Cl, 19.8.

4-phenyl-4-propionoxy-1,3-dimethylazacycloheptane (Compound V)

A solution of phenyl lithium was prepared, under a nitrogen atmosphere, from 0.667 g.-atom (4.6 g.) of lithium "shot" and 0.332 mole (52.0 g.) of bromobenzene in 50 ml. of anhydrous ether. The solution was cooled to −20°, and 0.10 mole (12.7 g.) of Compound III in 100 ml. of ether was added dropwise while stirring. The temperature was maintained at −20° for ½ hour after the addition was completed, then the mixture was allowed to warm to room temperature, and stand overnight under nitrogen. At this point the tertiary alcohol 4-phenyl-4-hydroxy-1,3-dimethylazacycloheptane (Compound IV), which may exist in two distereoisomeric forms, was present as its lithium salt.

The mixture was cooled to 0°, and 0.35 mole (45 ml.) of propionic anhydride in 100 ml. of dry toluene, containing 5 drops of 37 N sulfuric acid, was added dropwise while stirring. The temperature of the mixture was gradually raised, and about 75 ml. of ether distilled out as an equal volume of toluene was added dropwise. A temperature of 70–80° was then maintained for 2 hours.

The mixture was cooled to 0°, and 200 ml. of 1:3 48% hydrobromic acid-water solution was added dropwise while stirring. A three phase system resulted, consisting of a toluene layer, an aqueous acid layer, and the precipitated hydrobromide of Compound V (which may exist in two distereoisomeric forms). After stirring for 15 minutes, the mixture was filtered, and the precipitate washed with ether, then cold water, and finally acetone. The crude and incompletely dried precipitate was dissolved in a methanol-methyl ethyl ketone solvent mixture and the solution concentrated to a small volume.

The hydrobromide, M. P. 201–202° dec., of Compound V crystallized out. It was filtered off and washed with methyl ethyl ketone. Recrystallization from methanol-acetone raised the melting point to 207–207.5°. The solubility of the hydrobromide in water at room temperature was 1–2%.

Analysis.—Calcd. for $C_{17}H_{26}BrNO_2$: C, 57.32; H, 7.36; N, 3.93; Br, 22.41. Found: C, 57.14; H, 7.48; N, 3.80; Br, 22.71.

The picrate, M. P. 162–163°, of Compound V was formed by the addition of aqueous lithium picrate to a solution of the hydrobromide in dilute acetic acid.

Analysis.—Calcd. for $C_{23}H_{28}N_4O_9$: C, 54.70; H, 5.59; N, 11.10. Found: C, 54.46; H, 5.50; N, 11.04.

The base, B. P. 126° (0.3 mm.), $n_D^{28}$ 1.5182, was formed by treating an aqueous suspension of the hydrobromide with sodium hydroxide, extracting with ether, drying, and vacuum distilling.

Analysis.—Calcd. for $C_{17}H_{25}NO_2$: C, 74.15; H, 9.15; N, 5.09. Found: C, 73.83; H, 9.34; N, 5.17.

The hydrochloride, M. P. 207° dec., was formed by passing dry hydrogen chloride gas into a 1:2 methyl ethyl ketone-ether solution of the base.

Analysis.—Calcd. for $C_{17}H_{26}ClNO_2$: C, 65.50; H, 8.41; N, 4.49; Cl, 11.37. Found: C, 65.80; H, 8.63; N, 4.57; Cl, 11.1.

Another method for making the hydrochloride salt which is of general application for making other salts of the azacycloalkane free bases is as follows:

0.1 mole of the base is dissolved in 10 cc. of absolute ethanol and 0.15 mole of ethanolic hydrochloric acid is added dropwise while cooling. The excess hydrochloric acid and the ethanol are removed under reduced pressure at 35–45°. The residue is taken up in 75 cc. of a 1:1 diisopropyl-ketone-anhydrous ether mixture, seeded, then allowed to stand at +5° for 24 hours. The crystalline hydrochloride is filtered, washed with ether and dried over concentrated $H_2SO_4$ at 25° and 0.2 mm. for 5 hours. The following salts may be prepared in the same manner, utilizing the corresponding acid and the same proportions of reactants and solvents: hydrobromide, hydroiodide, sulfate, acid sulfate, phosphate, maleate, malate, tartrate, citrate, succinate, acetate, propionate, acetyl salicylate, etc.

The azacycloalkane free bases may be used to prepare quaternary ammonium compounds having good wetting properties. To prepare such compounds, the free bases are reacted with a long-chain aliphatic halide having from 8 to 18 carbon atoms, such as lauryl bromide, the temperature of reaction ranging from about 50° to about 150° C. Still another use of these alkylenimine compounds is in their ability to combine with penicillin to form salts therewith, this procedure being useful in purifying penicillin and even obtaining therapeutically valuable penicillin salts. In addition, at least one series of azacycloalkanes formed, specifically acetoxy and propionoxy azacycloalkanes, have been found to have valuable pharmacological effects, notably an unexpectedly good analgesic action. The above uses apply equally to the free bases or their acid-addition salts.

The substituents on the aryl ring may be present during the arylation step by being a part of the arylating reactant or the selected substituent may be added after arylation of the azacycloalkane ring. Thus, where it is desired that the aryl radical include one or more hydroxy-substituents on the ring, the above described reactions should utilize corresponding alkoxy-substituted compounds as reactants. After the alkoxy-substituted aryl-cyano-azacycloalkane is formed, one may convert the alkoxy group to a hydroxy group by dissolving the nitrile in 48% hydrobromic acid, heating until evolution of alkyl bromide begins. The temperature is maintained until reaction is completed, after which the excess acid is pumped off. The residue is then esterified by addition of alcohol and sulfuric acid and heating to refluxing overnight. The solution is then poured on ice and the sulfuric acid catalyst is removed by shaking with excess barium carbonate. The inorganic salts are filtered off and the filtrate is concentrated to dryness. The product may be recrystallized from alcohol.

The therapeutically useful compounds, more particularly those possessing analgesic action, may be utilized either orally, in suppository form or parenterally. For oral use, the compounds may be combined in known manner in the form of an elixir or other liquid form with excipients, such as suspending and flavoring agents. They may also be utilized in dry form, combined in the usual way with binding agents, sugars and other excipients for tablet or capsule form.

Having described our invention, what we claim is:

1. A compound of the group consisting of

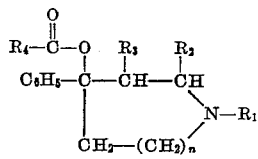

and the acid-addition salts thereof; wherein $R_1$ and $R_4$ each stand for lower alkyl and $R_2$ and $R_3$ each represent a member of the group consisting of hydrogen and lower alkyl and $n$ is a whole number from 2 to 3.

2. The compound having the formula

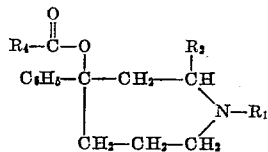

wherein $R_1$, $R_2$ and $R_4$ each stand for a lower alkyl radical.

3. The compound having the formula

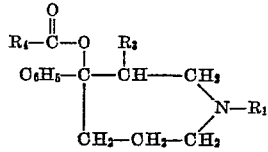

wherein $R_1$, $R_3$ and $R_4$ each stand for a lower alkyl radical.

4. The new compound, 4-acetoxy-4-phenyl-1-methyl-azacycloheptane.

5. The new compound, 4-acetoxy-4-phenyl-1,2-dimethyl-azacycloheptane.

6. The new compound, 4-phenyl-4-propionoxy-1,3-dimethyl-azacycloheptane.

7. The process comprising heating an omega-haloalkanonitrile having the formula $$NC-CH_2-(CH_2)_n-X$$

wherein $n$ represents a whole number from 2 to 3 and X stands for a halogen of the group consisting of chlorine, bromine and iodine with a loweralkyl-3-loweralkylaminopropionate having the formula

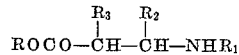

wherein R and $R_1$ each represent lower alkyls; while $R_2$ and $R_3$ each stand for a member of the group consisting of hydrogen and lower alkyl, in the presence of an acid binding agent at a temperature in the range of about 80° to about 150° C. to form an omega, omega-esternitrile compound, heating the latter at a temperature in the range of about 100° to 150° C. in the presence of an alkali-metal hydride catalyst, thereby forming a cyanoazacycloalkanone, decyanating said alkanone, reacting the decyanated compound with a phenyl Grignard reagent to form a 4-phenyl-4-hydroxy-N-loweralkyl-azacycloalkane and reacting the latter compound with a lower alkyl acyloxylating agent to form a 4-phenyl-4-loweralkyl acyloxy-N-loweralkyl-azacycloalkane.

No references cited